United States Patent Office 3,694,212
Patented Sept. 26, 1972

3,694,212
FILM SUPPORT COATED WITH POLYESTER AND GELATIN-SILVER HALIDE EMULSION
Lothar Richter, Seelenbinderstrasse 138, and Georg Eichhorn, Hoernle Strasse 3, both of Berlin-Kopenick, Germany
No Drawing. Continuation of application Ser. No. 630,840, Apr. 14, 1967. This application Aug. 3, 1970, Ser. No. 60,632
Int. Cl. G03c 1/80
U.S. Cl. 96—87 R                     3 Claims

ABSTRACT OF THE DISCLOSURE

An article comprising a cellulose ester- or polyehtylene terephthalate-based substrate, overlying and in contact with the substrate an adhesive coating consisting of the reaction product of glycerine with an aliphatic or aromatic dicarboxylic acid or acid anhydride containing up to 10 carbon atoms in its molecule in molar proportions of the glycerine to the dicarboxylic acid or acid anhydride of about 1:2, and overlying and in contact with the adhesive coating a coating of a photographic emulsion.

---

This is a continuation of application Ser. No. 630,840, filed Apr. 14, 1967, now abandoned.

In the photographic industry films and foils have been prepared for some time, which consisted substantially of cellulose derivatives serving as support for light sensitive gelatine-silver halide emulsions.

In this process, it was a major difficulty to achieve sufficient adherence of the hydrophilic, light-sensitive layer to the support.

In general, attempts have been made to overcome the above difficulty by providing the support with an intermediate coating providing in this way the connection between support and light sensitive emulsion. When this is done the adhesion between support and photographic emulsion must be so strong that a separation will not take place either in the dry or in the wet state.

When supports made of high molecular thermoplastic foils are used, these too have insufficient adhesion to the light-sensitive emulsion; moreover, they cause difficulties to the preparation of an intermediate layer owing to their resistance to chemicals.

In one of the older conventional processes, for example, gelatine was dissolved in an organic solvent and applied to the support preferably together with a high molecular hydrophobic substance, such as cellulose acetate. In that manner, a continuous layer is formed on the surface of the support which has sufficient hydrophophilic characteristics owing to the content of gelatine and thus imparts adhesive power to the support. When in using this method a suitable pH-value is adjusted in the adhesive layer, light sensitive emulsion layers of sufficient adhesive power in the wet state will be obtained, even when they contain a hardener.

A further possibility of pre-treating a film support is to apply to the support thin layers of plastics containing reactive groups in the molecule. As a rule, the plastics are copolymers of maleic anhydride with various vinyl monomers.

A further process for obtaining sufficient adhesive power consists in a chemical modification of the support by saponification or oxidation.

However, the known methods have disadvantages in their practical application. Thus, for example, a neutralization of the support has to follow the saponification or oxidation, respectively, and additional washing operations are necessary. The use of gelatine presents particular difficulties in industrial application. Moreover, difficulties appear in the re-use of scraps of film, so that a general introduction of these methods did not appear promising for practical purposes.

It is an object of this invention to provide a process for pretreating film support which makes it possible to avoid the cited disadvantages.

As mentioned before, the present invention relates to a pretreatment of film supports made of cellulose esters and high molecular weight thermoplastic foils by providing the supports with a surface coating in such a manner that a sufficient bonding is achieved between support and light-sensitive emulsion, not only in the dry state, but also in the wet state; in addition the invention provides for easy processing of film and re-use of waste products.

It was found, that one way to avoid the disadvantages of known methods consists in using polyester containing free epoxy groups in the molecule for preparing the adhesive layers. The support provided with these substratums has, after coating with an emulsion, an excellent adhesive power in the dry and wet states. Contrary to the support provided with the usual plastic substrate, the support pretreated with polyester substratum can be dissolved without any difficulty in suitable solvents, such as methylene chloride. In this manner, a reuse of scraps of film is possible; such recovery is an important economical factor in the photographic industry.

To prepare the polyesters, compounds containing at least three epoxy groups per molecule are reacted with aliphatic or aromatic polycarboxylic acids in such a manner that some free epoxy groups will remain in the molecule, which are capable of reacting with the gelatine of the photographic emulsion. One of the possible methods is to react one mole of a dissolved triepoxide with one mole of a dicarbocylic acid, whereby one epoxy group per unit remains free for reaction with gelatine.

It was further found, that the above mentioned disadvantages can be avoided, for example, when for the preparation of substrata polyesters are used which contain carboxylic groups in the molecule. A support equipped with such substrata has an excellent adhesive power in the dry and the wet state when coated with an emulsion.

To prepare suitable polyesters, polyalcohols or polyepoxides containing at least three functional groups are reacted with aliphatic, aromatic or hydroaromatic polycarboxylic acids in such a manner, that free carboxylic groups are present in the reaction product, one carboxylic group per unit being sufficient to give good results in adhesive power.

One of the possible methods consists of a reaction of one mole or a dissolved triepoxide with two moles of a dicarboxylic acid in such a manner that one carboxylic group forms an addition product with each unit of triepoxide.

The described reaction is preferably effected with polycarboxylic acids containing up to 10 C-atoms in the molecule. Particularly suitable are: maleic acid, succinic acid, taconic acid, itaconic acid, phthalic acid as well as the derivatives or mixtures of the acids. As epoxide components we may use stable derivatives of cyanuric acid or isocyanuric acid, respectively.

A further possibility of operating consists of reacting polyoxy compounds containing at least three functional groups in the molecule with polycarboxylic acids or their anhydrides whereby a polyester containing one free carboxylic group per unit is obtained.

Suitable reaction media are, among others, dioxan, ethylene chlorohydrin, dimethylsulfoxide, cyclohexanone, methylene chlorohydrin and dimethylformamide. As solvents for the polyester we may use methanol, acetone, methylene chloride, dichlorethane or other solvents swelling the support, or mixtures of such solvents. The applicability of the aforementioned compounds is not limited to the pretreatment of the support made of cellulose triacetate; excellent adhesive layers are also obtained on supports made of polyethylene-terephthalate when, in addition, aromatic oxy-compounds, halogenated aromatic oxy-compounds, halogenated aliphatic carboxylic acids or alkane bisphenols or derivatives of these compounds are added to the solution of the substratum.

EXAMPLE 1

14.9 g. triglycidyl cyanurate and 5.8 g. maleic acid are refluxed in 40 ml. ethylene chlorhydrin for one hour. After that time, the reaction is completed and the reaction mixture still contains one free epoxy group per mole triglycidyl cyanurate.

50 ml. of this solution are diluted with 20 ml. ethylene chlorohydrin and 1.93 l. of a mixture of methanol and acetone (1:3), the solution is applied to a cellulose triacetate support and dried at 80° C.

After coating with an emulsion, a photographic material is obtained having excellent adhesive power in the dry as well as the wet state, and the photographic emulsion will peel off from the support at the melting point only.

EXAMPLE 2

14.9 g. triglycidyl isocyanurate and 11.6 g. maleic acid are warmed up and dissolved under stirring with 40 ml. dioxan. Then the mixture is refluxed for three hours, after which time 2 or 3 epoxy groups of the triglycidyl isocyanurate will have reacted with the acid, and the reaction is discontinued. The excess acid aids in a further linking of the plastic during the drying process of the support at a temperature above 80° C. In this manner, a further increase in adhesive power is obtained.

50 ml. of the aforementioned reaction product are diluted with 20 ml. ethylene chlorohydrin and 1.930 l. of a mixture of methanol and acetone (1:3), applied to a cellulose triacetate support, and dried at a temperature above 80° C. After coating with an emulsion, a photographic material is obtained which will not peel off the support in the dry or the wet state.

EXAMPLE 3

15 g. triglycidyl isocyanurate and 10 g. phthalic acid are dissolved in 40 ml. dioxan and refluxed under stirring until 2.5 of the epoxy groups present per mole are esterified. The reaction is completed after about 5 hours. This reaction product is soluble in all the usual organic solvents, as for example methanol, acetone, methylene chloride, dichloro-ethane, and the like.

50 ml. of this reaction product are diluted wtih 20 ml. ethylene chlorohydrin and 1.930 l. of a mixture of methanol and acetone (1:2.8), applied to cellulose triacetate support and dried at a temperature above 80° C. After coating with an emulsion, a photographic material is obtained having an excellent adhesive power in the dry and the wet state.

EXAMPLE 4

15 g. triglycidyl isocyanurate and 10 g. phthalic acid are dissolved in 40 ml. dioxan and refluxed with stirring until 2.5 of the epoxy groups present per mole are esterified. The reaction is completed after about five hours.

To 25 ml. of this reaction solution are added 50 g. propane 2.2-bis (p-phenol) and it is diluted with 1 liter of a mixture of methylene chloride and methanol (1:2). This solution is applied to a film support made of polyethyleneterephthalate.

A thus pre-treated support has, after coating with an emulsion and drying, an excellent adhesive power in wet and dry state.

EXAMPLE 5

297 g. triglycidyl isocyanurate and 332 g. maleic acid are dissolved in 600 ml. dioxan with stirring and heating. Then the solution is further heated until the presence of only one carboxylic group can be found in the reaction solution.

50 ml. of this reaction solution are dissolved in 100 ml. ethylene chlorohydrin and filled up to 1 liter with a mixture of methanol and dichloro-ethane (1:1). This mixture is applied as a coating on cellulose triacetate.

After coating with an emulsion a photographic material is obtained having an excellent adhesive power in the dry and the wet state.

EXAMPLE 6

297 g. triglycidyl isocyanurate a nd 332 g. maleic acid are dissolved in 600 ml. dioxan with stirring and heating and then refluxed until 75 percent of the acid have reacted. The reaction takes about four hours.

25 ml. of the reaction solution are dissolved in a mixture of methylene chloride and methanol (3:1) containing 75 g. p-chloro-m-cresol per liter.

This solution is applied to a support of polyethylene-therephthalate. In this case, too, a photographic material having an excellent adhesive power in the dry and the wet state is obtained, after having been coated with an emulsion.

EXAMPLE 7

92 g. anhydrous glycerine, 196 g. maleic anhydride and 0.5 ml. boron trifluoride etherate are dissolved in 40 ml. dioxane under stirring and then nitrogen was passed through the heated solution until the presence of only one carboxylic group per unit could be detected.

50 ml. of this solution are diluted with 20 ml. ethylene chlorohydrin and 1.930 l. of a mixture of methanol and acetone (1:3). This mixture is coated onto cellulose triacetate support and dried at 80° C.

After coating with an emulsion, a photographic material having an excellent adhesive power in the dry and the wet state is obtained.

EXAMPLE 8

351 g. tri-(2,3-dioxypropyl) isocyanurate, 332 g. phthalic anhydride and 0.5 ml. boron trifluoride etherate are dissolved in 40 ml. dioxan under stirring and then heated, while nitrogen is passed through until the presence of only one carboxylic group per unit can be detected.

50 ml. of this solution are diluted with 20 ml. ethylene chlorohydrin and 1.930 l. of a mixture of methanol and acetone (1:2.9) and the mixture coated onto polyethylene-terephthalate support.

After coating with an emulsion, a photographic material having an excellent adhesive power in the dry and the wet state is obtained.

What is claimed is:

1. An article comprising a cellulose ester- or polyethylene terephthalate-based substrate, overlying and in contact with said substrate an adhesive coating consisting of the reaction product of glycerine with an aliphatic dicarboxylic acid or acid anhydride containing up to 10 carbon atoms in its molecule in molar proportions of the glycerine to the dicarboxylic acid or acid anhydride of about 1:2, and overlying and in contact with the adhesive coating a coating of a photographic gelatin-silver halide emulsion.

2. An article according to claim 1, in which the substrate is polyethylene terephthalate-based.

3. An article according to claim 1, in which the acid or acid anhydride is maleic acid, maleic anhydride, succinic acid or itaconic acid.

References Cited

UNITED STATES PATENTS 2,096,616   10/1937   Nadeau _____ 96—87
1,929,290   10/1933   Schmidt _____ 96—87

RONALD H. SMITH, Primary Examiner